United States Patent
Guettge et al.

(10) Patent No.: US 12,363,055 B2
(45) Date of Patent: Jul. 15, 2025

(54) SYSTEM AND METHOD FOR REMOTE CONTROL OF A MEASUREMENT INSTRUMENT

(71) Applicant: Rohde & Schwarz GmbH & Co. KG, Munich (DE)

(72) Inventors: Fabian Guettge, Unterhaching (DE); Mirko Soellner, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 1 day.

(21) Appl. No.: 18/446,908

(22) Filed: Aug. 9, 2023

(65) Prior Publication Data

US 2024/0214334 A1    Jun. 27, 2024

(30) Foreign Application Priority Data

Dec. 23, 2022   (EP) ..................... 22216333

(51) Int. Cl.
*H04L 51/046* (2022.01)
*G05B 15/02* (2006.01)
*H04L 51/02* (2022.01)

(52) U.S. Cl.
CPC ............ *H04L 51/046* (2013.01); *G05B 15/02* (2013.01); *H04L 51/02* (2013.01)

(58) Field of Classification Search
CPC ........ H04L 51/046; H04L 51/02; G05B 15/02
See application file for complete search history.

(56) References Cited

U.S. PATENT DOCUMENTS

| | | |
|---|---|---|
| 10,359,279 B2 | 7/2019 | Abe |
| 2007/0124406 A1 | 5/2007 | Liu et al. |
| 2010/0299392 A1 | 11/2010 | Chiou |
| 2013/0158934 A1 | 6/2013 | Lee et al. |
| 2015/0188855 A1 | 7/2015 | Liu et al. |
| 2019/0372799 A1* | 12/2019 | Zhang ............... H04L 51/046 |
| 2023/0259101 A1* | 8/2023 | Deiss ............... H04L 51/02 |
| | | 700/160 |

FOREIGN PATENT DOCUMENTS

WO      2010/024778 A1     3/2010

OTHER PUBLICATIONS

Fanfan, Samuel. Instrument Control for Beam Position Monitor Calibration and Diagnostics Using Matlab. Diss. Cornell University, 2013. (Year: 2013).*
Extended European Search Report issued in EP 22216333.9-1213 by the European Patent Office on May 19, 2023.

* cited by examiner

*Primary Examiner* — Soe Hlaing
(74) *Attorney, Agent, or Firm* — Studebaker Brackett PLLC

(57) ABSTRACT

A system for remote control of a measurement instrument comprises a protected local network and a measurement instrument connected to the protected local network. The measurement instrument is configured to execute a local instant messaging software. The local instant messaging software forms a remote control interface for the measurement instrument.

15 Claims, 5 Drawing Sheets

500

501 — Executing, by a measurement instrument 101 being connected to a protected local network 102, a local instant messaging software 103 forming a remote control interface 104 for the measurement instrument 101.

Fig. 5

SYSTEM AND METHOD FOR REMOTE CONTROL OF A MEASUREMENT INSTRUMENT

FIELD OF THE INVENTION

The invention relates to a system for remote control of a measurement instrument, in particular by means of an instant messaging app. The invention also relates to a corresponding method and computer program.

TECHNICAL BACKGROUND

To enable remote control of a measurement instrument, conventional solutions e.g., include a remote control software installed on a laptop which is connected to the measurement instrument via a computer network, or a smartphone which requires a special remote control app installed that can log into the same computer network as the measurement instrument, to communicate with the measurement instrument.

In both conventional cases, a predefined application has to be downloaded and installed on a mobile device (that is, the laptop computer or mobile phone) which should act as the remote control. Moreover, network settings have to be configured on the mobile device to enable the predefined application to connect to the network in which the to be controlled network instrument is located. This typically is a complex task. It is therefore difficult to remotely control a measurement instrument using mobile devices.

Conventional solutions thus lack a way to comfortably and securely remote control a measurement instrument using a mobile device.

SUMMARY OF THE INVENTION

Against this background, the object of the present invention is to provide a comfortable and secure solution to remote control a measurement instrument with a mobile device.

The invention is set out in the appended set of claims. The object is solved by the features of the independent claims. The dependent claims contain further developments.

A first aspect of the present invention provides a system for remote control of a measurement instrument, wherein the system comprises a protected local network; and a measurement instrument connected to the protected local network; wherein the measurement instrument is configured to execute a local instant messaging software forming a remote control interface for the measurement instrument.

This is beneficial, as a user can control a measurement instrument remotely by only using a mobile device such as a smartphone. The smartphone only needs an instant messaging software installed to communicate with the measurement instrument. This also facilitates that a user can use functions of his smartphone (e.g., camera, audio/video recording, GPS data) to enrich a current measurement task (performed by the measurement instrument) with metadata. Another advantage is that the proposed solution relies on a mobile device that a user always has with him. This means that unplanned activities are also possible and general comfort is higher due to the smaller number of devices being carried. Moreover, no special software is required on the mobile device, but a standard instant messaging app can be used, which can be installed from an application store.

While a conventional remote control software, e.g., on a desktop computer, usually has no access to the measurement instrument from outside a local network, since the measurement instrument is located in a restricted network, according to the proposed solution of the present disclosure, both the user and the measurement instrument are in a role of a "client" (compared to the "server", which provides the instant messaging service, as such). The measurement instrument can contact the instant messaging service server, e.g., via an http interface. Similarly, a mobile device can connect to the instant messaging service server, which then links the mobile device to the measurement instrument. The mobile device does not have to be connected within the perimeter of the network of the measurement instrument.

In particular, the measurement instrument can comprise at least one of: a radio frequency, RF, measurement device, an oscilloscope, a spectrum analyzer, a power meter, an IQ recorder, a signal generator, a medical measurement device, a temperature gauge, an acoustic measurement device, a neutrino detector, a weather gauge.

In particular, the term local network includes a local area network. Additionally, or alternatively, the term local network in particular includes a wireless local area network.

In particular, the protected local network is separated from the internet via a firewall. That is, the firewall implements the protection of the protected local network.

The local instant messaging software can be installed directly on the measurement instrument, but also on a device connected to the measurement instrument.

In an implementation form of the first aspect, the system further comprises a wireless remote control device configured to execute a remote instant messaging software to communicate remote control information to and/or from the local instant messaging software.

This ensures that any kind of wireless device may act as the wireless remote control device, as long as it has an instant messaging software installed.

In particular, the wireless remote control device comprises at least one of: a user equipment, a smartphone, a user terminal, a mobile phone, a tablet, a laptop computer, a desktop computer, a smartwatch.

In particular, the wireless remote control device is connected to the protected local network.

In particular, the wireless remote control device is indirectly connected to the protected local network. E.g., this is done by an instant messaging server which relays and exchanges information between the wireless remote control device and the measurement instrument. The instant messaging server can e.g. be provided by a third party, such as an instant messaging service provider.

In particular, the wireless remote control device may connect to the protected local network by using a phone number. In particular, the phone number identifies the measurement instrument.

In particular, user authentication means can be used to authenticate a user of the wireless remote control device, before remote controlling the measurement instrument and/or before connecting to the protected local network.

In a further implementation form of the first aspect, the local instant messaging software comprises a chatbot.

This is beneficial, as a user of the wireless remote control device control the measurement instrument by exchanging text messages (i.e., by "chatting" with the measurement instrument).

In a further implementation form of the first aspect, the remote control information comprises information according to the Virtual Instrument Software Architecture, VISA, protocol.

This ensures that VISA information can be exchanged between the wireless remote control device and the measurement instrument, to control the measurement instrument.

In a further implementation form of the first aspect, the remote control information comprises information according to the Standard Commands for Programmable Instruments, SCPI, protocol.

This ensures that SCPI information can be exchanged between the wireless remote control device and the measurement instrument, to control the measurement instrument.

In a further implementation form of the first aspect, the remote control information comprises a list of network devices available in the protected local network and in particular metadata associated with at least one of the network devices.

This ensures that the wireless remote control device can be used to identify, connect to and to control other network devices in the protected local network.

In particular, the metadata comprises a device identifier. The device identifier can identify the other network device within the protected local network.

In a further implementation form of the first aspect, the remote control information comprises at least one of: image data, video data, audio data, GPS data, a voice command.

This ensures that a measurement task performed by the measurement device can controlled by, and/or enriched with additional information, such as the information mentioned above.

In particular, the system is configured to forward the remote control information to the measurement instrument, and the measurement instrument is configured to associate at least one of the image data, the video data, the audio data, or the GPS data with a measurement task and/or store at least one of the image data, the video data, the audio data, or the GPS data.

This ensures that a measurement task performed by the measurement device can controlled by, and/or enriched with additional information, such as the information mentioned above.

In particular, the system is configured to control the measurement device based on the voice command.

A second aspect of the present invention provides a method for remote control of a measurement instrument, wherein the method comprises executing, by the measurement instrument being connected to a protected local network, a local instant messaging software forming a remote control interface for the measurement instrument.

In an implementation form of the second aspect, the method further comprises the step of executing, by a wireless remote control device, a remote instant messaging software to communicate remote control information to and/or from the local instant messaging software.

In a further implementation form of the second aspect, the local instant messaging software comprises a chatbot.

In a further implementation form of the second aspect, the remote control information comprises information according to the Virtual Instrument Software Architecture, VISA, protocol.

In a further implementation form of the second aspect, the remote control information comprises information according to the Standard Commands for Programmable Instruments, SCPI, protocol.

In a further implementation form of the second aspect, the remote control information comprises a list of network devices available in the protected local network and in particular metadata associated with at least one of the network devices.

In a further implementation form of the second aspect, the remote control information comprises at least one of: image data, video data, audio data, GPS data, a voice command.

The second aspect and its implementation forms include the same advantages as the first aspect and its respective implementation forms.

A third aspect of the present disclosure provides a computer program comprising instructions which, when the program is executed by a computer, cause the computer to perform the method according to the second aspects or any of its implementation forms.

The third aspect includes the same advantages as the first aspect and its respective implementation forms.

An exemplary embodiment of the invention is now further explained with respect to the drawings by way of examples only, in which FIG. 1 shows a schematic view of a system according to an embodiment of the present invention;

FIG. 5 shows a schematic view of a method according to an embodiment of the present invention.

DETAILED DESCRIPTION

Figure 1:
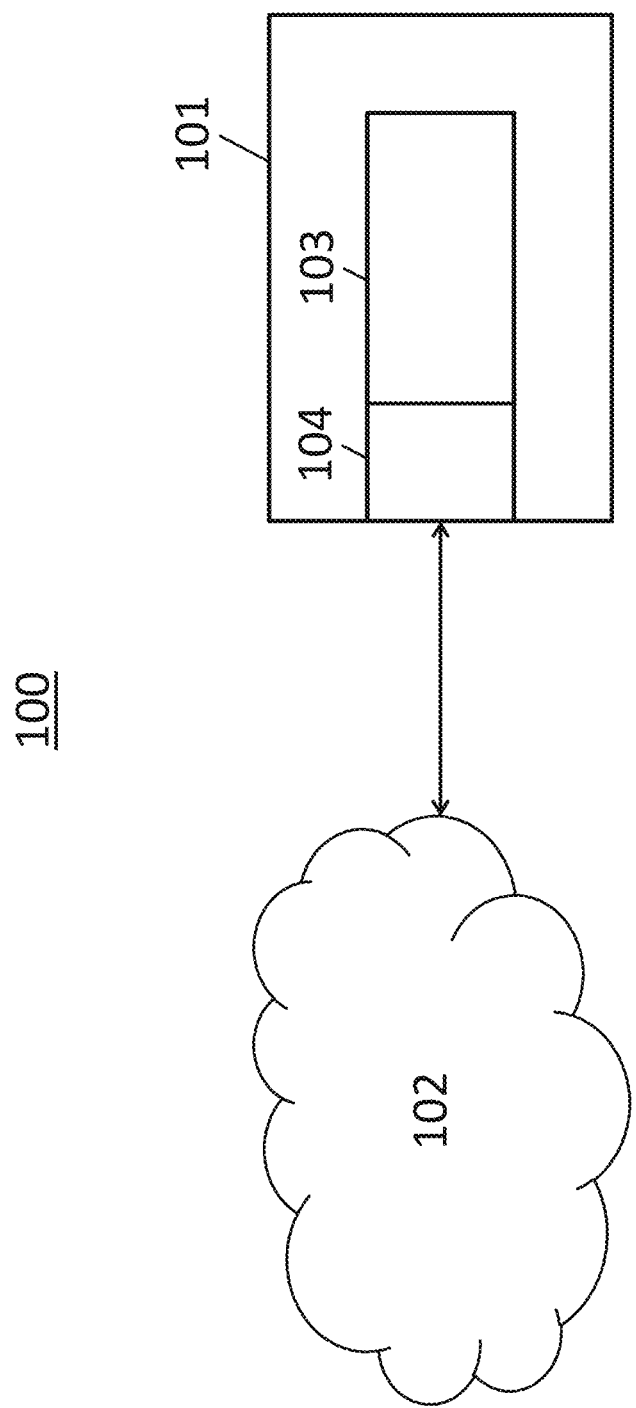

FIG. 1 shows a schematic illustration of a system 100 for remote control of a measurement instrument 101. To this end, the system 100 comprises a protected local network 102 and a measurement instrument 101 connected to the protected local network 102. The protected local network 102 may e.g. include a router and/or firewall, to which the measurement instrument 101 is connected by means of a network connection.

As shown in FIG. 1, the measurement instrument 101 executes a local instant messaging software 103. The local instant messaging software 103 can e.g., be executed on the measurement instrument 103 itself, or on a device connected to the measurement instrument 103 which is also located inside the protected local network 102. The local instant messaging software 103 can send instant messages to an instant messaging server (which is e.g., located outside the protected local network 102 and/or operated by a third party) and/or receive instant messages from the instant messaging server. These instant messages may include control instructions for remotely controlling the measurement instrument 101. That is, the local instant messaging software 103 forms a remote control interface 104 for the measurement instrument 101.

Figure 2:
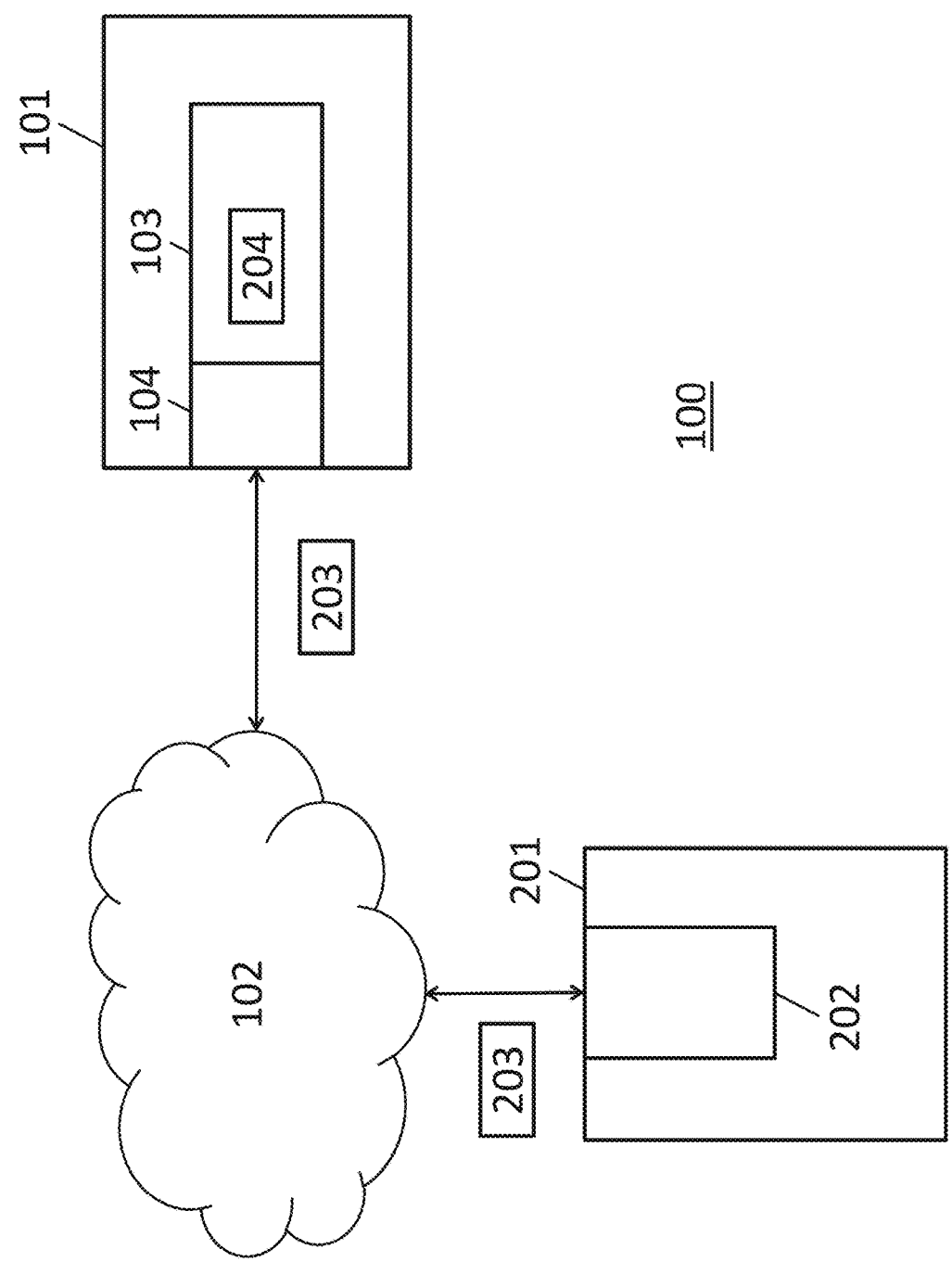
FIG. 2 shows a schematic view of a system according to an embodiment of the present invention in more detail.

The system 100 is now going to be described in more detail in view of FIG. 2. The system 100 of FIG. 2 includes all functions and features of the system 100 as described in view of FIG. 1.

As shown in FIG. 2, the system 100 optionally can comprise a wireless remote control device 201 which executes a remote instant messaging software 202. The remote instant messaging software 202 acts as a client to the instant messaging server. Also the local instant messaging software 103 with the remote control interface 104 can be regarded as a client to the instant messaging server. Both clients exchange information via the server. That is, the remote instant messaging software 202 communicates remote control information 203 to and/or from the local instant messaging software 103.

Further optionally the local instant messaging software 103 comprises a chatbot 204. That is, the remote control information 203 can be input at the wireless remote control device 201 as a text message. Also, a response of the measurement instrument 101 can be output at the wireless remote control device 201 as a text message.

Further optionally, the remote control information 203 can comprise information according to the Virtual Instrument Software Architecture, VISA, protocol. That is, a user input at the wireless remote control device 201 can be in the form of VISA information, or can be translated to VISA information, e.g., by the wireless remote control device 201 or the chatbot 204. The VISA information is then sent to the measurement instrument 101 for controlling said instrument. The same scenario holds true for Standard Commands for Programmable Instruments (SCPI) information. That is, optionally the remote control information 203 can comprise information according to the SCPI protocol.

Further optionally, the measurement instrument may communicate if other network devices are present in the protected local network 102, which then could also be controlled by the wireless remote control device 201. To this end, the measurement instrument 101 determines a list of network devices available in the protected local network 102 and in particular metadata (such as an identifier, e.g., an IP address) associated with at least one of the network devices. This list is then provided to the wireless remote control device 201 as part of the remote control information 203. The wireless remote control device 201 may then either directly connect to and control one of the other network devices (which e.g., may be facilitated by another local instant messaging software installed on that other network device), or may control the other network device via the measurement instrument 101, which is used to forward remote control information 203.

Further optionally, the remote control information 203 can comprise at least one of: image data, video data, audio data, GPS data, a voice command.

In case of image data, video data, audio data, or GPS data, this data can be used to enrich a measurement task with additional information. E.g., image, video, audio or GPS information is provided to the measurement instrument 101, which then associates this information with a measurement task, and/or uses this information during the measurement task.

In case of the remote control information 203 comprising a voice command, this command can be evaluated at the wireless remote control device 201, the chatbot 204 and/or the measurement instrument 101 to control the measurement instrument 101.

Figure 3:
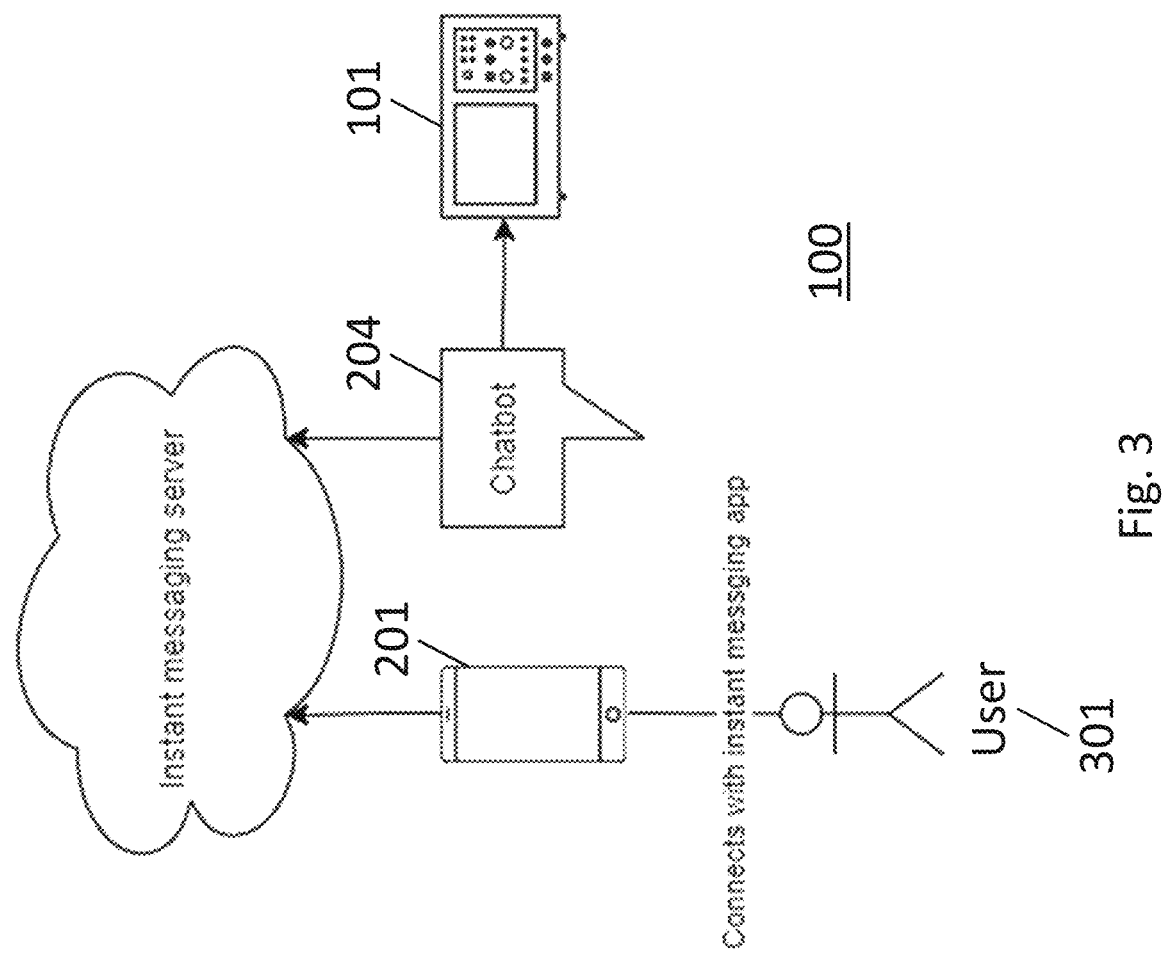
FIG. 3 shows a schematic view of an operating scenario according to the present invention.

FIG. 3 illustrates an operating scenario, in which a measurement instrument 101 is remotely controlled via a smartphone instant messaging app, that is, via the wireless remote control device 201.

The measurement instrument 101 is located in a protected network area, that is, in the protected local network 102.

Because of a firewall present in the local network, it is generally not possible for a user 301 to send remote control commands to the measurement instrument 101 from outside the network. However, a program may run in the network of the measurement instrument 101 that establishes a connection to a server of an instant messaging service and registers itself within this as a chatbot 204 and establishes a remote control connection (e.g. based on VISA, and/or SCPI) to the measurement instrument 101. The user 301 can then start a chat with the chatbot 204 via his smartphone instant messaging app. The chatbot 204 forwards remote control commands entered into this chat to the measurement instrument 101. The chatbot 204 enters available data from the measurement instrument 101 (e.g. answers to query commands) in the chat and sends them to the user.

Remote control commands can be VISA or SCPI commands. However, other commands can also be defined, which are first converted into VISA, SCPI or other commands, e.g. by the chatbot 204. This allows the user 301 to communicate at a higher level of language, compared to VISA or SCPI. In this case, the chatbot 204 is device-specific (that is, language specific).

The chatbot 204 can also provide other functionalities, e.g., a list of all devices (including metadata such as device identification) in the network, establishing a connection to a specific device, querying the device status, transmitting measurement curves as images or transmitting a screenshot of the measurement instrument 101.

The system 100 also enables the use of smartphone services such as a camera or voice recognition. The user 301 can post an image, video, audio or other data (e.g. GPS data) in the chat. These are forwarded to the measurement instrument 101, e.g., by the chatbot 204, where they are directly linked to the active measurement and saved. By using smartphone voice recognition, the measurement instrument 101 could also be controlled by voice input from the smartphone (e.g. by sending voice messages to the chatbot 204).

The chatbot 204 program only has to be started once in a network. It can then forward the commands of many users 301 to different measurement instruments 101. Access control ensures that only authorized users can access the measurement instruments 101 via the chatbot 204. The chatbot 204 program can run on a PC in the protected local network or directly on a measurement instrument 101.

Figure 4:
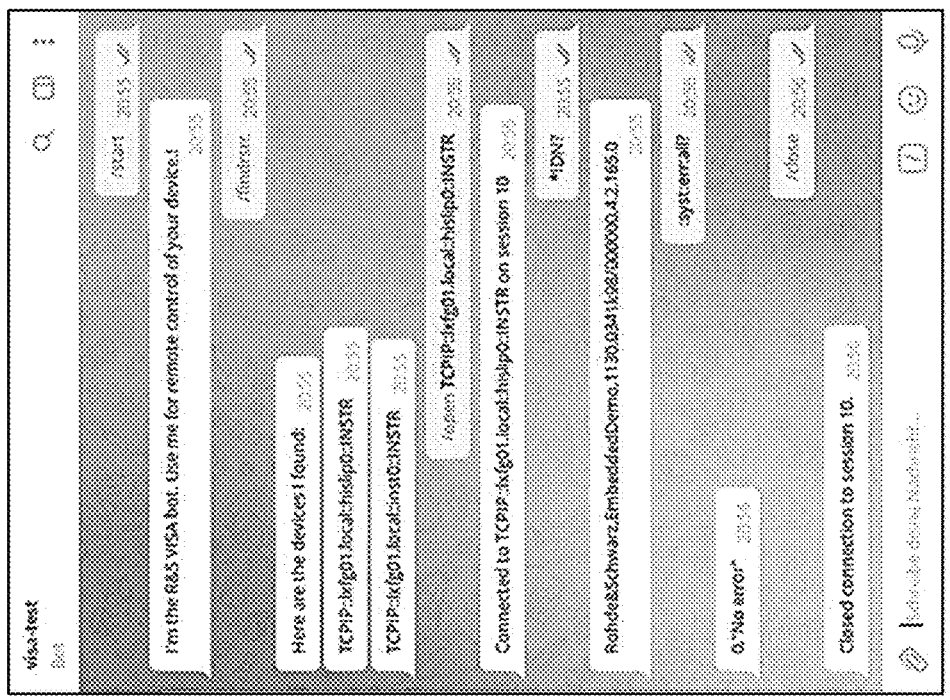
FIG. 4 shows another schematic view of an operating scenario according to the present invention.

FIG. 4 shows messages 400 exchanged at a wireless remote control device 201. The messages 400 are exchanged with the measurement instrument 101 (facilitated by an intermediate instant messaging server) and can include natural language, VISA commands, or SCPI commands. On the right hand side of FIG. 4, user input at the wireless remote control device 201 is shown, while on the left hand side, a corresponding response from the measurement instrument 101 is illustrated.

FIG. 5 schematically shows a method 500 for remote control of a measurement instrument 101. The method 500 comprises the step of executing 501, by the measurement instrument 101, which is connected to a protected local network 102, a local instant messaging software 103 forming a remote control interface 104 for the measurement instrument 101.

It is important to note that the inventive device and method very closely correspond. Therefore, all the above said regarding the device is also applicable to the method. Everything which is described in the description and/or claimed in the claims and/or drawn in the drawings can be combined.

The invention is not limited to the illustrated embodiment. The network devices may be mobile terminals such as mobile phones, but also computers such as personal computers or the like. All features described above, or features shown in the figures can be combined with each other in any advantageous manner within the scope of the invention.

The invention claimed is:

1. A system for remote control of a radio frequency, RF, measurement device, wherein the system comprises:
   a protected local network;
   the RF measurement device which is connected to the protected local network;
   wherein the RF measurement device is configured to execute a local instant messaging software forming a remote control interface for the RF measurement device;
   a wireless remote control device configured to execute a remote instant messaging software to communicate remote control information to the local instant messaging software; and
   wherein the RF measurement device and the wireless remote control device each execute instant messaging software configured to communicate with each other through a third-party instant messaging server located outside the protected local network.

2. The system according to claim 1, wherein the remote control information comprises information according to Virtual Instrument Software Architecture, VISA, protocol.

3. The system according to claim 1, wherein the remote control information comprises information according to Standard Commands for Programmable Instruments, SCPI, protocol.

4. The system according to claim 1, wherein the remote control information comprises a list of network devices available in the protected local network.

5. The system according to claim 1, wherein the remote control information comprises at least one of: image data, video data, audio data, GPS data, and a voice command.

6. The system according to claim 1, wherein the local instant messaging software comprises a chatbot.

7. A method for remote control of a radio frequency, RF, measurement device, wherein the method comprises:
   executing, by the RF measurement device being connected to a protected local network, a local instant messaging software forming a remote control interface for the RF measurement device;
   executing, by a wireless remote control device, a remote instant messaging software to communicate remote control information to the local instant messaging software; and
   wherein the RF measurement device and the wireless remote control device each execute instant messaging software configured to communicate with each other through a third-party instant messaging server located outside the protected local network.

8. The method according to claim 7, wherein the remote control information comprises information according to Virtual Instrument Software Architecture, VISA, protocol.

9. The method according to claim 7, wherein the remote control information comprises information according to Standard Commands for Programmable Instruments, SCPI, protocol.

10. The method according to claim 7, wherein the remote control information comprises a list of network devices available in the protected local network.

11. The method according to claim 7, wherein the remote control information comprises at least one of: image data, video data, audio data, GPS data, and a voice command.

12. A non-transitory computer-readable storage medium storing instructions which, when executed by a computer, cause the computer to carry out the steps according to claim 7.

13. The system according to claim 4, wherein the remote control information comprises metadata associated with at least one of the network devices.

14. The method according to claim 10, wherein the remote control information comprises metadata associated with at least one of the network devices.

15. The method according to claim 7, wherein the local instant messaging software comprises a chatbot.

* * * * *